United States Patent [19]
Denaeyer et al.

[11] 3,844,726
[45] Oct. 29, 1974

[54] PROCESS FOR MANUFACTURING GRANULES CONTAINING SODIUM CHLORITE IN A FLUIDIZED BED DRIER

[75] Inventors: José Luis Denaeyer; Willy Kegelart, both of Brussels, Belgium

[73] Assignee: Selvay & Cie, Brussels, Belgium

[22] Filed: Apr. 12, 1972

[21] Appl. No.: 243,252

Related U.S. Application Data

[63] Continuation-in-part of Ser. No. 106,546, Jan. 14, 1971, abandoned.

[30] Foreign Application Priority Data
Apr. 13, 1971  Belgium .............................. 102099

[52] U.S. Cl. .................... 23/301 R, 23/302, 23/313, 423/472
[51] Int. Cl. ........................ B01d 9/00, C01b 11/10
[58] Field of Search .. 423/473, 472; 23/313, 300 C, 23/301 R, 302

[56] References Cited
UNITED STATES PATENTS
| | | | |
|---|---|---|---|
| 2,520,915 | 9/1950 | Cunningham | 423/472 |
| 2,567,959 | 9/1951 | Munday | 23/313 |
| 3,006,721 | 10/1961 | Mollard | 23/313 |
| 3,231,413 | 1/1966 | Berquin | 23/313 |

FOREIGN PATENTS OR APPLICATIONS
332,705   11/1903   France ............................. 423/473

OTHER PUBLICATIONS
C & En, Dec. 26, 1960, "Britain Starts Making NaClO2," page 40.
Forbath, Chem Eng., pages 180–182, June 12, 1961, Vol. 68, 12.

*Primary Examiner*—Wilbur L. Bascomb, Jr.
*Assistant Examiner*—S. J. Emery
*Attorney, Agent, or Firm*—Spencer & Kaye

[57] ABSTRACT

A process for the manufacture of granules containing sodium chlorite from an aqueous medium containing sodium chlorite, including the steps of passing the medium into a fluidized bed drier for evaporating water from the medium, and maintaining in the drier a constant presence of seeds smaller than the required granules.

6 Claims, 3 Drawing Figures

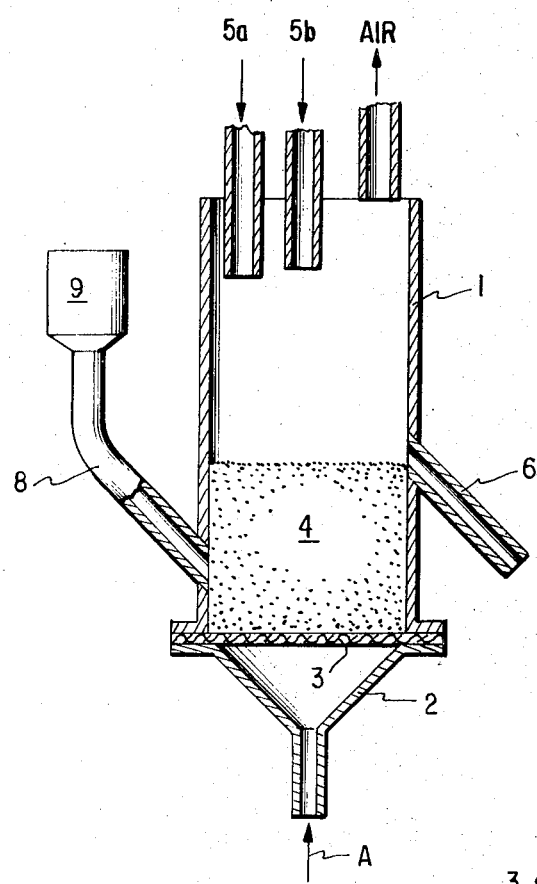
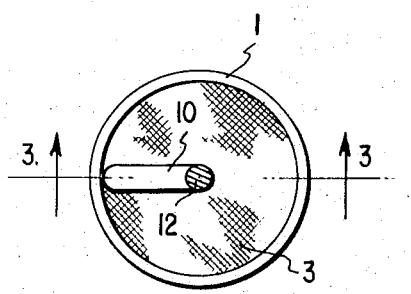
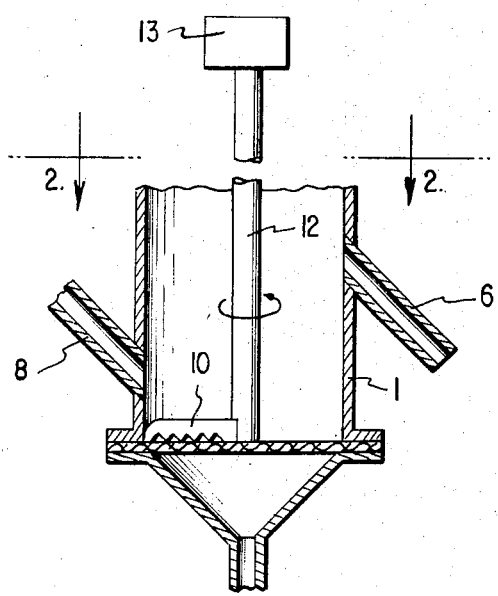

PROCESS FOR MANUFACTURING GRANULES CONTAINING SODIUM CHLORITE IN A FLUIDIZED BED DRIER

CROSS-REFERENCE TO RELATED APPLICATION

The present application is a continuation-in-part application of U.S. patent application Ser. No. 106,546, filed Jan. 14th, 1971, now abandoned, for a "Sodium Percarbonate Process and Product."

BACKGROUND OF THE INVENTION

The invention relates to a process for manufacturing granules containing sodium chlorite by drying an aqueous medium containing chlorite in a fluidized bed permanently containing seeds smaller in size than the required granules.

Technical literature contains references to various processes for preparing solid sodium chlorite from a solution or, generally, any chlorite containing aqueous medium. Crystallization is the first stage in one of these processes and this may be followed by centrifugal separation and drying of the crystals (see, for example, U.S. Pat. No. 2,520,915 of Apr. 26th, 1945, in the name of DIAMOND ALKALI CO). In another process, which has become a standard procedure, drying is effected by atomization (cf. the article by T. P. FORBATH in Chemical Engineering, 1961, 68, No. 12, pp. 180–182), the end product being a fine crystalline powder. Rotary drum driers heated internally by steam tubes and supplied with product by a prethickener (cf. FIAT report, Final Report No. 825, chlorine dioxide and sodium chlorite at I. G. Farben, Griesheim, p.4) are also used. Here, the end product is in flake or fine crystal form. Occasionally, the chlorite is dried in several stages at progressively increasing temperatures (cf. Belgian Pat. No. 452,924 of Oct. 22nd, 1943, in the name of Solvay & Cie). Manufacture of sodium chlorite granules in which the first stage is preparation of trihydrate crystals by evaporation under vacuum, then followed by fusing individual crystals and arranging them in the form of a fluidized bed in a solution saturated with chlorite, or even drying the surface of the trihydrate crystals with a stream of inert gas (French Pat. No. 1,187,352 of Nov. 29th, 1957, and French Pat. No. 1,228,234 of Mar. 10th, 1959, both in the name of SOCIETE D'ELECTROCHIMIE, D'ELECTROMETALLURGIE ET DES ACIERIES D'UGINE) has also been suggested. Lastly, there have been references to the fact that use of a fluidized bed process for drying trihydrate crystals is beneficial. (A. I. KACHALOV — Khimicheskaya Promyshlennosti, 1960, pp. 336 to 339).

Owing to the comparatively large number of chemical operations involved, most of these processes are extremely laborious. Finally, others such as the atomization or rotary drum processes produce chlorites in powder, fine crystal, or flake form which do not meet the criteria of many customers.

SUMMARY OF THE INVENTION

An object of the present invention, therefore, is to provide a process for preparing a solid, dehydrated sodium chlorite product in the form of granules of predetermined size in a single operation starting from an aqueous medium containing sodium chlorite.

This as well as other objects which will become apparent in the discussion that follows are achieved, according to the present invention, in a process for manufacturing granules containing sodium chlorite from an aqueous medium containing sodium chlorite, characterized in that water from the aqueous medium is evaporated on its being introduced into a fluidized bed drier, drying being effected in the constant presence of seeds the dimensions of which are smaller than those of the desired granules. The seeds may be particles of sodium chlorite or any substance compatible with sodium chlorite.

GENERAL ASPECTS OF THE INVENTION

Application of similar processes to the manufacture of extremely diverse products, particularly fertilizers, sodium sulphate, zinc sulphate, sodium chloride, calcium chloride, caustic soda, etc., has been known for some time. However, to our knowledge, it has never been suggested that such a process should be applied to the preparation of granules containing sodium chlorite from a solution or other aqueous medium. This is undoubtedly due to the potential difficulties raised by the sensitivity of chlorites to temperature and shock.

The process per the invention can be implemented either continuously or discontinuously. It is used for treating solutions containing chlorite and possibly other compatible substances, preferably concentrated solutions or aqueous suspensions obtained after prethickening, for example. The aqueous medium containing chlorite is passed into a fluidized bed drier, either into a zone located above the bed, or within the fluidized bed.

The fluidized bed of chlorite particles must always contain seeds smaller than the required granule size, as these seeds are to receive nourishment from the chlorite liberated by the aqueous medium. As already mentioned, these seeds may consist of sodium chlorite particles or particles of another substance compatible with the chlorite, such as particles of sodium chloride, sodium nitrate, sodium carbonate, etc. The supply of seeds for the fluidized bed may come from an outside source, from a crusher, for example, or may be formed in situ. We prefer the latter owing to the sensitivity of chlorite to shock. The fluidized bed drier is merely equipped with a mechanical arrangement for breaking up the granules, a stirrer or scraper, for instance, fitted in the midst of the fluidized bed. The seeds can also be formed by atomizing the aqueous medium containing chlorite under conditions such that it reaches the fluidized bed in the form of individual particles or droplets. Any standard arrangement, such as a nozzle, can be used for this purpose.

The seeds can also be produced in situ by breaking particles already in the bed mechanically, by selecting an adequate atomizing gas flow rate.

We have observed that the sodium chlorite particles in the fluidized bed tend to compact and that this may, in some cases, lead to complete agglomeration of the bed and thus to a risk of chlorite thermal decomposition. This disadvantage can be overcome by fitting a stirrer, a wiper, for example, at the bottom of the drier. The purpose of this arrangement is twofold: to prevent the bed from compacting and to prepare seeds by breaking up some of the granules mechanically.

The temperature of the air or other carrier gas introduced at the base of the fluidized bed, for example, through fabric or a distribution plate, should preferably be under approximately 180°C and operating conditions should be adjusted such that the temperature inside the fluidized bed does not exceed 80°C.

The fluidized bed drier can be cylindrical, cylindroconical, parallelepipedic or any other shape suitable for application of the process.

The chlorite granules can be discharged by any recognized means, for example, via the base of the drier under elutriation or via a lateral overflow pipe, this pipe thus determining the height of the fluidized bed.

BRIEF DESCRIPTION OF THE DRAWING

FIG. 1 is a cross-sectional elevational view of a fluidized bed drier suitable for use in the present invention.

FIG. 2 is a view of a modified fluidized bed drier from the line 2 — 2 of FIG. 3.

FIG. 3 is a view of the drier of FIG. 2 from the line 3 — 3 of FIG. 2.

DESCRIPTION OF THE PREFERRED EMBODIMENTS

FIG. 1 illustrates a suitable fluidized bed drier for carrying out the process of the invention. Clamped between cylinder 1 and air guide 2 is a unit 3 which has the function of uniformly distributing in the cylinder the air flowing into the guide 2 in the direction of arrow A. The air flowing from the unit 3 into the cylinder creates a fluidized bed 4 of particles. Nozzles 5a, 5b are provided for the spraying of aqueous medium into the fluidized bed. Lateral tubular outlet 6 continually draws off particles from the fluidized bed.

Various embodiments assure a constant presence of crystallization seeds.

It is possible to continuously supply the drier with crystallization seeds through a tube 8 from a bin 9.

In accordance with another interesting embodiment, the particles which are used as seeds to form new granules are formed by mechanically destroying inside the fluid bed drier a portion of the granules already formed. For this purpose, the fluid bed drier may be provided with devices such as agitators, crushers, scrapers, etc. which can operate continuously. FIGS. 2 and 3 illustrate an embodiment where a scraper is used. The scraper, part 10 in FIGS. 2 and 3, is connected rigidly to shaft 12. Motor 13 thus can move the scraper continuously around the inner periphery of cylinder 1. The scraper removes and comminutes build-up on the bottom of the cylinder and additionally traps free particles between itself and the wall of the cylinder and comminutes them.

Further illustrative of the invention are the following examples:

EXAMPLE 1

The drier used consists of a cylinder 15 cm in diameter and 60 cm high, the base of which is fitted with a plate for distributing the gas. The plate is topped with a stainless steel gauze of 3 mm mesh. A scraper fitted with small flexible stainless steel blades rotates on this gauze at a rate of 250 to 300 revs/min. The granules are discharged from the bottom of the bed via a pipe 15 mm in diameter into which passes a draught of cold elutriation air at the rate of 3 standard m³/hr. The particle bed is fluidized by passing a blast of air (53 standard m³/hr.) heated to 135°C through the distribution plate. The height of the bed of fluidized particles is approximately 15 cm and the temperature about 55°C. Initially, the drier contains 2 kg of sodium chlorite particles or a compatible substance.

The drier is fed continuously via an atomizer plunged into the bed into which a solution having the following composition:

| | | |
|---|---|---|
| $NaClO_2$ | 326 | gm/kg of solution |
| $NaClO_3$ | 5 | do. |
| NaCl | 86 | do. |
| $Na_2CO_3$ | 9 | do. |
| NaOH | 5 | do. | passes at the rate of 3,300 gm/hour and at 35°C.

As soon as the plant is fully operational, 1.40 kg/hr of a product having the following composition:

| | | |
|---|---|---|
| $NaClO_2$ | 744 | gm/kg |
| $NaClO_3$ | 11 | do. |
| NaCl | 196 | do. |
| NaOH | 1 | do. |
| $Na_2CO_3$ | 41 | do. |
| $H_2O$ | 7 | do. | are withdrawn via the granule discharge tube.

The physical characteristics of the granules obtained are as follows:
— particle size: diameter between 0.5 and 0.6 mm
— freely flowing apparent specific weight: 1.3 kg/dm³
— dissolution rate: total dissolution of 10 gm in one liter of water at 15°C within 45 secs.

Compaction does not occur when this process is used because the scraper acts as a stirrer, breaking up the granules into seeds. The end product is perfectly uniform and always has the same chemical composition and physical properties. Depending upon the operating conditions selected, a product containing only 0.5 to 1 percent of water can be prepared from the solution in a single operation by means of this process.

Of course, this example can be implemented in a number of different ways without stepping outside the scope of the invention. A drier with a lateral overflow may be used, the solution may be introduced above the fluidized bed, a scraper of another type may be provided or even omitted altogether. In this case, however, special care must be taken to ensure that the solution disperses properly to form droplets which, on drying before settling on the fluidized particles, will act as seeds for the generation of new particles. Either the droplets must be large enough to give new seeds on drying, or seeds must be prepared by breaking the particles already in the bed mechanically, depending upon the type of sprayer.

A solution or aqueous medium having a composition other than the one in the example, particularly a solution containing a variable amount of sodium chlorite and/or containing salts other than those mentioned can be processed. The nature of the particles initially present in the drier is immaterial provided that it is a product compatible with chlorite.

EXAMPLE 2

In this example, a description is given of a method for implementing the invention in which the seeds are prepared in the bed by breaking up the component particles mechanically. For this purpose an adequate pulverizing air flow rate is chosen.

A drier, comprising a pyrex tube 30 cm in diameter and 1.5 m high, fitted at the base with a gas distribution plate consisting of a plate perforated with holes 2 mm in diameter, is used. No bladed scraper is provided. The fluidization zone which is 45 cm above the perforated plate comprises a steam heated pipe bundle of 0.1 $m^2$ surface area. Granules are discharged from the fluidized bed via a lateral overflow.

The nourishing solution is introduced via a pneumatic atomizer mounted on the wall 10 cm away from the perforated plate. It is dispersed into extremely fine droplets which are deposited on the fluidized grains, shattered mechanically by the impact produced by the pulverizing jet of air.

The initial charge of the bed consists of 40 kg of technical chlorite granules (84 percent by weight $NaClO_2$) of approximately 0.5 mm diameter drawn from previous manufacture. It may also consist of sodium chloride granules. This charge is fluidized by passing a 200 standard $m^3$/hr stream of air heated to 120°C through the perforated plate. The gage pressure of the steam heating the pipe bundle is 2 $kg/cm^2$. The bed temperature is thus raised to 60°C.

The air flow rate at the atomizer is 10 standard $m^3$/hr and carries an aqueous solution consisting (per kg of solution) of 301 gm of $NaClO_2$, 8 gm $NaClO_3$, 32 gm of NaCl, 2.7 gm of NaOH and 4.3 gm of $Na_2CO_3$ at a rate of 11.7 kilograms of solution per hour.

4 kg per hr. of product are removed automatically via the fluidized bed overflow. This product consists of granules having an average diameter of approximately 0.5 mm and a free flowing apparent specific weight of 1.45 $kg/dm^3$. The chemical composition, per kilogram of product, is as follows: $NaClO_2$ 844 gm; $NaClO_3$ 21 gm; NaCl 100 gm; NaOH 0.3 gm; $Na_2CO_3$ 25 gm.

In this test, the air was not recirculated. The granule overflow outlet could be easily replaced by an elutriation outlet as in the previous example.

EXAMPLE 3

An apparatus identical to the one described in Example 2 is loaded with an initial charge consisting of 25 kg of sodium chloride fluidized by passing 150 standard $m^3$/hr of air raised to 120°C through a perforated plate. The steam gage pressure in the pipe bundle is also 2 $kg/cm^2$. The bed temperature is 60°C. Air passing through the atomizer at 9.5 standard $m^3$/hr disperses an aqueous solution consisting (per kg of solution) of 271 gm of $NaClO_2$, under 2 gm of $NaClO_3$, 9.7 gm of NaCl, 7.7 gm of NaOH, 6.1 gm of $Na_2CO_3$ and 194 gm of $NaNO_3$ into the bed at the rate of 7 kilograms of solution per hour. After the system has been operating for 40 hours and practically all the initial NaCl charge has been removed, the overflow from the bed yields a solid product consisting (per kg) of 482 gm of $NaClO_2$, 2 gm max. of $NaClO_3$, 48 gm of NaCl, 13.3 gm of NaOH, 14.9 gm of $Na_2CO_3$ and 427 gm of $NaNO_3$ at a rate of 3.4 kg/hr. The product consists of granules of approximately 0.8 mm diameter and has a free flowing apparent specific weight of 1.3 $kg/dm^3$. This is sodium nitrate enriched chlorite with improved stability.

EXAMPLE 4

Instead of preparing the seeds in the bed by means of a suitable pulverizing jet of air, as described in Examples 2 and 3 above, in this example sodium chloride seeds are introduced at a given rate.

The apparatus used is the one employed in the two previous examples. An initial charge consisting of 40 kg of 80 percent sodium chlorite is fluidized by air of fluidization raised to 120°C and introduced at the rate of 200 standard $m^3$/hr. The steam gage pressure in the pipe bundle is 2 $kg/cm^2$, to produce a bed temperature of about 60°C. 4 standard $m^3$/hr of air carrying 11.7 kg per hour of an aqueous solution containing per kg of solution 301 gm of $NaClO_2$, 8 gm of $NaClO_3$, 32 gm of NaCl, 2.7 gm of NaOH and 4.3 gm of $Na_2CO_3$ are fed in via the atomizer. 0.2 kg/hr of solid NaCl seeds having an average particle size of 0.187 mm are also introduced. 4.2 kg/hr of a solid product comprising, per kg, 800 gm of $NaClO_2$, 20 gm of $NaClO_3$, 150 gm of NaCl, 0.3 gm of NaOH and 25 gm of $Na_2CO_3$ are obtained from the bed overflow. This product consists of granules of approximately 0.7 mm diameter and has a free flowing apparent specific weight of 1.4 $kg/dm^3$.

It will be understood that the above description of the present invention is susceptible to various modifications, changes and adaptations, and the same are intended to be comprehended within the meaning and range of equivalents of the appended claims.

We claim:

1. A process for the manufacture of granules containing sodium chlorite from an aqueous liquid medium containing sodium chlorite, comprising the steps of evaporating water from said medium by passing said medium into a fluidized bed drier containing a fluidized bed of particles fluidized with a carrier gas having a temperature at the base of the fluidized bed of from 120°C to less than 180°C, while maintaining in said fluidized bed a constant presence of seeds smaller in size than the required granules and maintaining the temperature in the fluidized bed below 80°C.

2. A process as claimed in claim 1 wherein the step of maintaining includes introducing the seeds into the drier from an external source.

3. A process as claimed in claim 1 wherein the step of maintaining includes forming the seeds in situ in the drier by mechanically comminuting granules in the fluidized bed.

4. A process as claimed in claim 1 wherein the step of maintaining includes forming the seeds in the drier by dessicating individual droplets obtained by atomizing the aqueous medium.

5. A process as claimed in claim 3 wherein the step of maintaining includes gas jet feeding the aqueous medium into the bed for mechanically comminuting granules in the bed.

6. A process as claimed in claim 1 wherein the step of maintaining includes moving a scraper on the base of the drier for preventing compaction of the particles present in the fluidized bed.

* * * * *

UNITED STATES PATENT OFFICE
CERTIFICATE OF CORRECTION

Patent No. 3,844,726     Dated October 29th, 1974

Inventor(s) Denaeyer et al

It is certified that error appears in the above-identified patent and that said Letters Patent are hereby corrected as shown below:

In the heading of the patent, line 6, change "Selvay & Cie" to --Solvay & Cie.--.

Column 6, line 35, delete "liquid".

Signed and sealed this 7th day of January 1975.

(SEAL)
Attest:

McCOY M. GIBSON JR.
Attesting Officer

C. MARSHALL DANN
Commissioner of Patents